United States Patent
Capron (10) Patent No.: US 11,781,357 B2
(45) Date of Patent: Oct. 10, 2023

(54) EMERGENCY OPENING DEVICE FOR AN AIRCRAFT DOOR, COMPRISING A RETAINING MEMBER WITH A HOOK

(71) Applicant: LATECOERE, Toulouse Occitaine (FR)

(72) Inventor: Nicolas Capron, Castanet Tolosan Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 281 days.

(21) Appl. No.: 17/262,135

(22) PCT Filed: Jul. 23, 2019

(86) PCT No.: PCT/EP2019/069760
§ 371 (c)(1),
(2) Date: Jan. 21, 2021

(87) PCT Pub. No.: WO2020/020866
PCT Pub. Date: Jan. 30, 2020

(65) Prior Publication Data
US 2021/0348431 A1    Nov. 11, 2021

(30) Foreign Application Priority Data
Jul. 24, 2018 (FR) ...................................... 1856873

(51) Int. Cl.
*E05F 1/00* (2006.01)
*E05F 1/10* (2006.01)
*B64C 1/14* (2006.01)

(52) U.S. Cl.
CPC ............ *E05F 1/105* (2013.01); *B64C 1/1423* (2013.01); *E05Y 2201/474* (2013.01);
(Continued)

(58) Field of Classification Search
CPC ..... E05F 1/105; E05F 1/00; E05F 1/08; E05F 1/10; E05F 1/1008; E05Y 2800/252;
(Continued)

(56) References Cited

U.S. PATENT DOCUMENTS 5,031,863 A * 7/1991 Noble .................... B64C 1/1407
  D12/345
5,064,147 A * 11/1991 Noble .................... B64C 1/1407
  292/DIG. 31

(Continued)

FOREIGN PATENT DOCUMENTS

DE    202016003562    9/2017
EP    0741073    11/1996
(Continued)

*Primary Examiner* — Chi Q Nguyen
(74) *Attorney, Agent, or Firm* — Defillo & Associate, Inc.; Evelyn A. Defillo (57) ABSTRACT

An emergency opening device for an aircraft door provided with an opening mechanism includes an actuation device (2, 5) for actuating the opening mechanism, having: a tubular operating member (2) equipped with a second locking end (4) that includes a radial retaining finger (19); flexible compression device (5); a retaining member (9) for the second locking end (4), the retaining member (9) including a hook (28) which has a stop surface, the retaining member (9) being rotatable about the movement axis of the operating member (2); activation device (31) for the actuation device (2, 5), adapted to cause the retaining member (9) to open.

19 Claims, 4 Drawing Sheets

(52) U.S. Cl.
CPC ... *E05Y 2201/686* (2013.01); *E05Y 2800/252* (2013.01); *E05Y 2900/502* (2013.01)

(58) Field of Classification Search
CPC ........... E05Y 2201/686; E05Y 2201/22; E05Y 2900/502; E05Y 2201/474; E05Y 2201/68; B64C 1/1423
See application file for complete search history.

(56) References Cited

U.S. PATENT DOCUMENTS

| | | | |
|---|---|---|---|
| 5,289,615 A | 3/1994 | Banks | |
| 8,307,496 B2* | 11/2012 | Wu | E05F 3/108 |
| | | | 16/72 |
| 8,443,488 B2* | 5/2013 | Zhang | E05F 3/221 |
| | | | 16/65 |
| 9,702,176 B2* | 7/2017 | Janak | E05F 1/105 |
| 10,472,041 B2* | 11/2019 | Hacault | B64C 1/1407 |
| 2002/0184733 A1 | 12/2002 | Lin | |
| 2009/0020382 A1* | 1/2009 | Van Weelden | F16F 9/465 |
| | | | 188/282.3 |
| 2016/0002965 A1 | 1/2016 | Janak | |
| 2017/0314583 A1* | 11/2017 | Koscielniak | F15B 15/227 |
| 2018/0148156 A1* | 5/2018 | Hacault | B64C 1/1407 |
| 2021/0070416 A1* | 3/2021 | Buchet | E05C 9/08 |
| 2021/0229792 A1* | 7/2021 | Blum | E05B 15/0086 |
| 2022/0081941 A1* | 3/2022 | Samuelson | B64C 1/1407 |

FOREIGN PATENT DOCUMENTS

| | | |
|---|---|---|
| EP | 2644495 | 10/2013 |
| FR | 2830564 | 4/2003 |
| FR | 2864021 | 6/2005 |
| FR | 2975967 | 12/2012 |

\* cited by examiner

EMERGENCY OPENING DEVICE FOR AN AIRCRAFT DOOR, COMPRISING A RETAINING MEMBER WITH A HOOK

CROSS REFERENCE TO RELATED APPLICATION

This application is a national stage entry of PCT/EP2019/069760 filed Jul. 23, 2019, under the International Convention claiming priority over French Patent Application No. 1856873 filed Jul. 24, 2018.

TECHNICAL FIELD

The invention relates to the field of aeronautics and concerns an emergency opening device for an aircraft door fitted with an opening mechanism.

Aircraft doors comprising an opening mechanism can be opened in order to allow passengers to exit and to enter, or to allow evacuation in an emergency situation. In the event of an emergency evacuation of the passengers, the aircraft doors, whether these be passenger doors or emergency evacuation doors, usually comprise an emergency opening device which, if activated, brings about rapid and effortless opening of the doors, without the need for human intervention.

Such emergency opening devices conventionally comprise means for actuating the door opening mechanism, which means can switch between a passive state and an active state of activating the opening mechanism (which brings about the opening of the door), and means for activating the actuating means (which allow a user to initiate the emergency opening).

PRIOR ART

At the present time, as notably described in patent applications FR2830564 and EP0741073, the actuating means conventionally consist of an actuator of pneumatic type powered by means of an ancillary reserve of driving fluid. Such actuating means do, however, have a number of disadvantages. Specifically, and in the first place, they are relatively weighty and relatively bulky, notably because of the presence of the ancillary reserve of driving fluid. In addition, they require periodic checks on the pressure of the driving fluid, and require the ancillary reserve to be replaced periodically even if it has not been used. Finally, following activation of the emergency opening device, these actuating means, in order to be returned to an operational status, require the ancillary reserve of driving fluid to be replaced.

Another current solution notably described in patent application FR2864021 allows the bulkiness and weight of the actuating means to be reduced. Specifically, with this solution, the actuating means consist of a pyrotechnic ram, that is to say an autonomous ram that does not need to be supplied from a source of driving fluid. On the other hand, such pyrotechnic rams have to be periodically inspected and replaced even if not used. These pyrotechnic rams also have to be replaced after the emergency opening device has been activated.

Patent application FR2975967 describes an aircraft emergency opening device which overcomes the abovementioned disadvantages. That emergency opening device consists of actuating means of mechanical design making it possible to dispense with pneumatic or pyrotechnic elements. The weight and bulkiness of the emergency opening device are thus reduced, the reliability is increased, and this device requires little or no maintenance. However, the emergency opening device described requires activation means comprising an electromagnet. This emergency opening device is therefore not entirely mechanical because it has recourse to an electromechanical element which requires an external source of electrical energy and to a control device designed to connect the electromagnet to this external source of electrical energy. This door opening device therefore requires, in addition to this external source of electrical energy, energy-supply and control wiring which may be an additional source of complexity and malfunctioning. The reason why an electromagnet is needed in this emergency opening device is that the retainer applies a significant force to an operating member, such that the transition of the retainer into the open position in order to release the operating member for emergency opening requires this force to be overcome. The emergency opening device comprises a reset portion and jaws that allow a very significant retaining force to be obtained, which means that elastic means of appreciable rating can be employed. In this configuration, creating a retainer that is purely mechanical and can be activated by an individual would entail a lever arm of excessive length incompatible with the objectives of compactness of the emergency opening device.

DISCLOSURE OF THE INVENTION

The object of the invention is to improve the emergency opening devices of the prior art by providing such a device the operation and control of which are purely mechanical, and in which the transition of the retainer from its closed position in which it locks the operating member to its open position in which it releases this operating member for the purposes of emergency opening requires only very little effort on the part of the user triggering the emergency opening device.

To this end, the invention concerns an emergency opening device for an aircraft door fitted with an opening mechanism, comprising:

actuating means for actuating the opening mechanism, which can switch between a passive state and an active state of activating the opening mechanism, and which comprise: a tubular operating member provided with a first end for connecting to the door, and with a locking second end; elastic compression means arranged between a fixed end-stop element and the operating member; a retainer for restraining the locking second end, able to move between a closed position of locking of the locking second end, in a position of the operating member corresponding to the passive state of the actuating means in which position the elastic means are kept compressed, and an open position of releasing of the locking second end allowing the operating member to move along an axis of movement toward a position corresponding to the active state of the actuating means, under the effect of the force resulting from the expansion of the elastic means;

means for activating the actuating means designed to bring about the opening of the retainer.

In this emergency opening device:

the operating member has a radial retaining finger on its locking second end;

the retainer comprises a hook which has a stop surface, the retainer being able to rotate about the axis of movement between its closed position, in which the stop surface is in contact with the radial retaining finger to lock the locking second end, and its open position, in which the stop surface is away from the radial retaining finger.

In the present description and the claims, the expression "connected to the door" means relative to the aircraft door in the broadest sense. The aircraft door in the broadest sense includes the opening panel of the door, the door opening mechanism, or else the structure framing the door and connected to the fuselage (corresponding to the doorpost).

Thus, the first end of the actuating member is connected to one element of the door (opening panel, opening mechanism, or framing structure) and the fixed end-stop element is connected to another element of the door (opening panel, opening mechanism, or framing structure) which elements are such that expansion of the elastic means causes actuation of the door opening mechanism and actual opening of the door. For example, the first end of the actuating member may be fixed to the door opening mechanism, and the fixed end-stop element may be fixed to the opening panel of the door. In another example, the first end of the actuating member may be fixed to the opening panel of the door, and the fixed end-stop element may be fixed to the structure framing the door.

Such an emergency opening device offers all the advantages of a mechanical device as described in document FR2975967. These actuating means have lower weight and bulkiness. The mechanical design of the actuating means requires no special maintenance while the opening device is not used. The use of the opening device does not require the replacement of a triggering member, as is required with pneumatic or pyrotechnic devices. No driving fluid is required for activating the actuating means.

The device according to the invention is also fully mechanical and requires no connection to an external source of energy or to a remote-operation device. Such a device forms an end-product of the fully autonomous mechanical ram type, which is a hallmark of operational reliability and safety, both of which are highly sought after in the field of aeronautics and more especially of emergency opening devices.

Although the device according to the invention is fully mechanical and autonomous, it may comprise highly rated elastic means, namely means intended to apply a significant opening force to the door opening mechanism, something which is needed in this emergency door opening application. Despite the high rating of the elastic elements, the actuating means can be activated effortlessly because of the rotary retainer.

The emergency opening device according to the invention may include the following additional features, either individually or in combination:

the locking second end has the radial retaining finger passing radially right through it;

the retainer comprises a rotary latch equipped with an axially extending blade, the hook being made in the blade;

the rotary latch comprises two axially extending blades, a hook being made in each blade, two slots for the passage of the radial retaining finger being formed between the blades;

the means for activating the actuating means comprise a lever designed to force the retainer to rotate;

the fixed end-stop element comprises: an abutment flange against which the elastic means can bear; a working window tailored to suit the travel of the lever and interrupting the abutment flange;

the retainer has a shape that can be inscribed inside a cylinder coaxial with the operating member;

the retainer is mounted with the ability to rotate with respect to the fixed end-stop element;

the device comprises an axis cylinder fixed to the fixed end-stop element, the operating member being mounted with the ability to slide on the axis cylinder along the axis of movement;

the operating member surrounds the axis cylinder and comprises a sliding portion guiding the sliding of the operating member on the axis cylinder;

the retainer surrounds the axis cylinder and is mounted with the ability to rotate on the axis cylinder;

the retainer is axially fixed to the axis cylinder, being held between two sliding axial end stops;

the axis cylinder comprises a guide slot for guiding the radial retaining finger along the axis of movement;

the radial retaining finger passes radially through the axis cylinder at the guide slot;

the guide slot has an end-of-travel end stop for the radial retaining finger;

the radial retaining finger comprises a rolling ring designed to roll over the stop surface;

the stop surface is substantially orthogonal to the axis of movement;

the stop surface forms, with respect to a surface orthogonal to the axis of movement, an angle comprised between 1 and 5 degrees;

the elastic compression means comprise a tubular spring at least partially surrounding the operating member and the ends of which are placed between the fixed end-stop element and the operating member.

DESCRIPTION OF THE FIGURES

Further features and advantages of the invention will become apparent upon reading the following non-limiting description, with reference to the appended figures, in which.

DETAILED DESCRIPTION

Figures 1, 2:
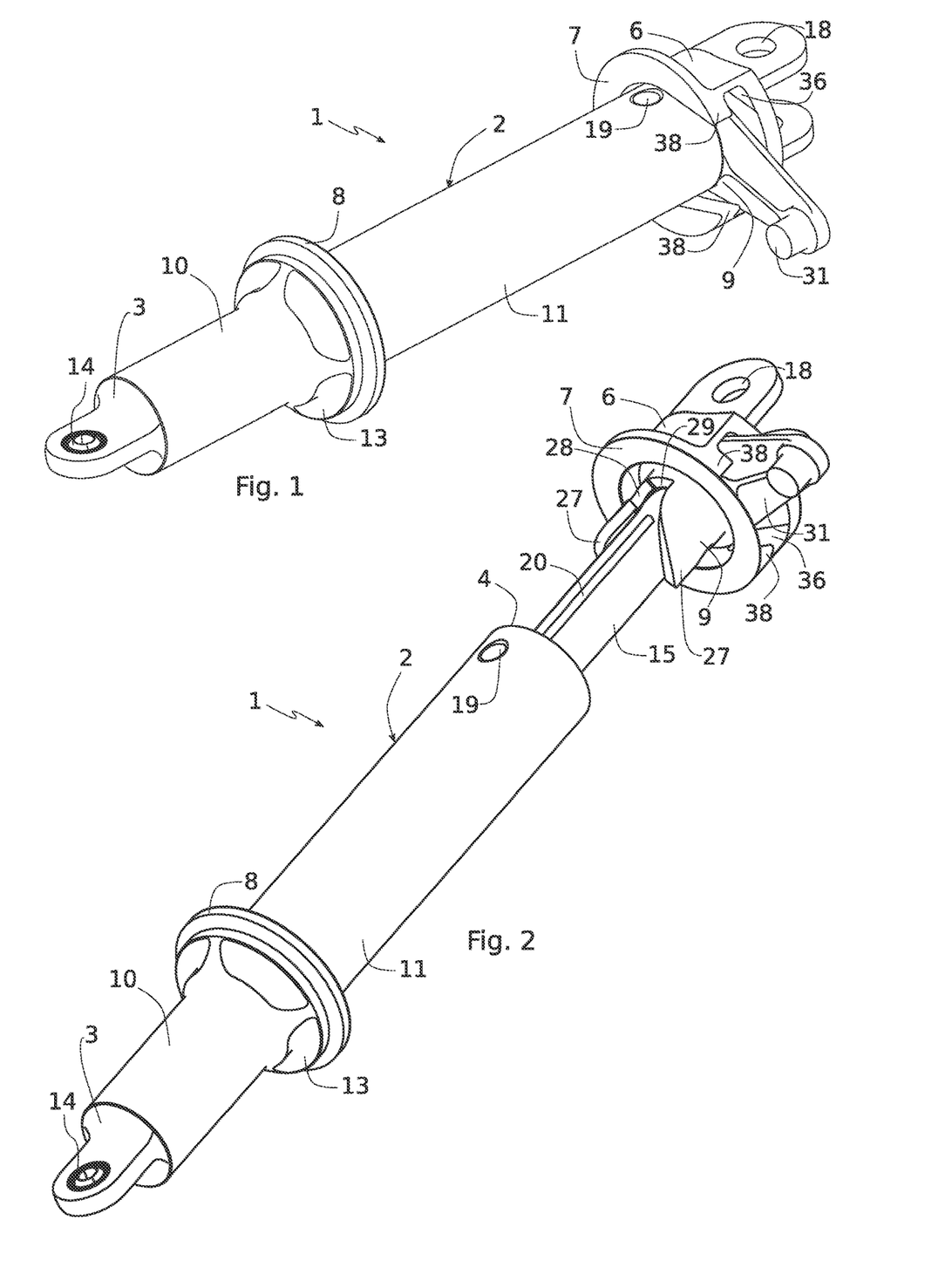
FIG. 1 is a perspective view of an emergency opening device according to the invention, in its passive state.
FIG. 2 depicts the device of FIG. 1 in its active state.

The aircraft door emergency opening device 1 according to the invention is depicted in perspective in FIGS. 1 and 2, in its passive state and in its active state, respectively. This device 1 is intended to be connected by its ends to elements of the aircraft door in such a way that expansion of this device 1 (in the active state, FIG. 2) brings about the emergency opening of the door.

This emergency opening device 1 can be positioned on any type of aircraft door or opening panel that has an opening mechanism. Aircraft door opening mechanisms are well known and not described in further detail here. The device 1 may for example be mounted in such a way as to collaborate with a door opening mechanism having a chain transmission, as described in document FR2975967, or else in other known opening mechanisms such as mechanisms involving link rods forming a deformable parallelogram.

Whatever the type of aircraft door opening mechanism, the emergency opening device 1, when activated by a user, allows rapid and automatic opening of the aircraft door so that this aircraft can be evacuated.

Figure 3:
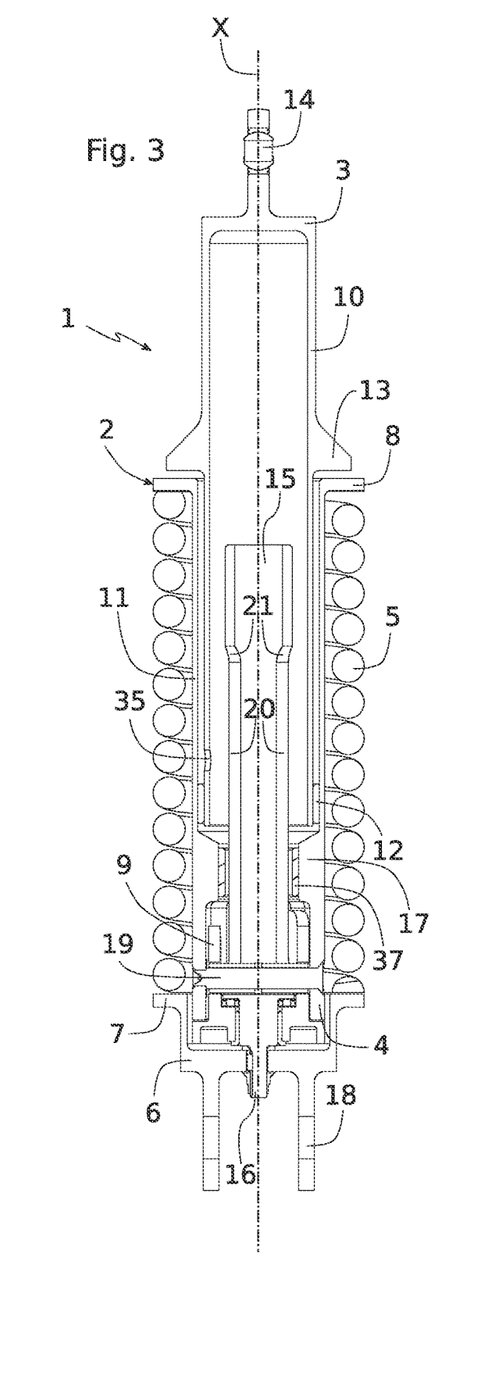
FIG. 3 is a view in longitudinal section of the device in its position of FIG. 1.
Figure 4:
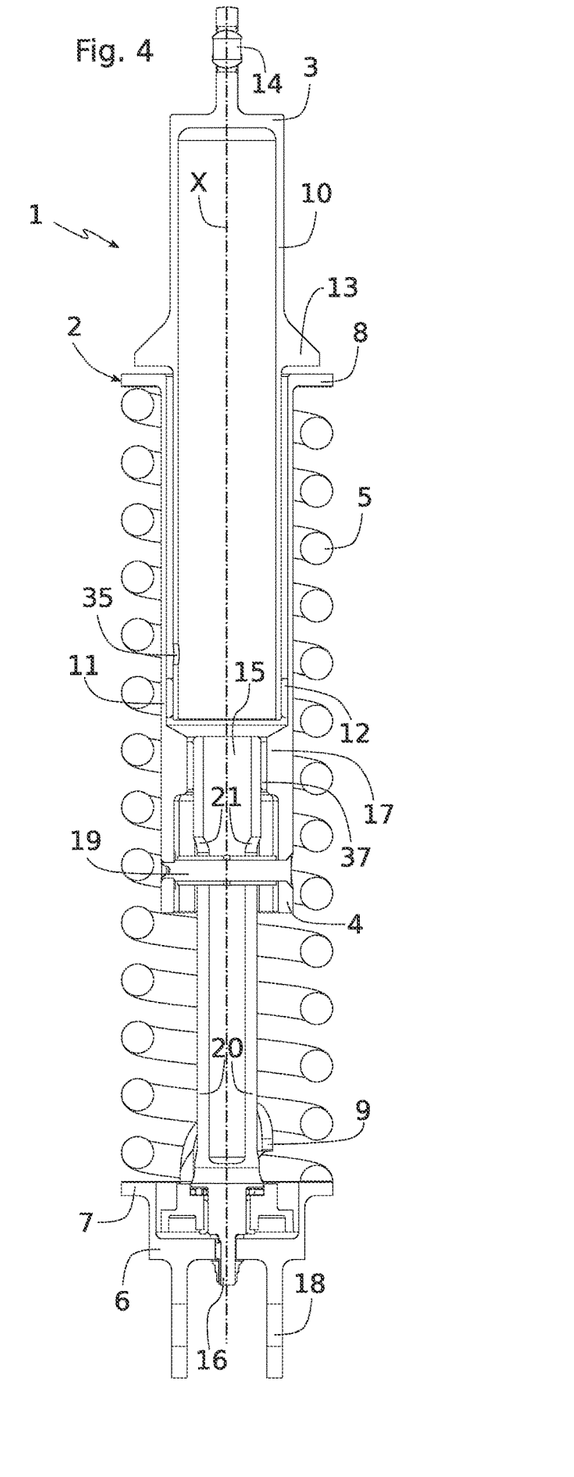
FIG. 4 is a view in longitudinal section of the device in its position of FIG. 2.

With reference to FIGS. 3 and 4, the device 1 comprises means for actuating the door opening mechanism, which means can switch between the passive state of FIG. 1 and the active state of FIG. 2. In the passive state, the device 1 applies no load to the door or the door opening mechanism, and the emergency opening function is not activated; this corresponds to the normal state of operation of the door opening mechanism. In the active state, in the event of an emergency and when the aircraft needs to be evacuated, the door opening mechanism is activated by force exerted by the device 1 until the door is fully open (device 1 in the position of FIGS. 2 and 4).

With reference to FIGS. 3 and 4, these means for actuating the door opening mechanism comprise a tubular operating member 2 which is able to move along an axis of movement X which is the longitudinal axis thereof. This operating member 2 comprises a first end 3 for connecting to a door element which has not been depicted (for example the opening mechanism) and comprises a second end 4 referred to as the locking end. The first end 3 comprises a ball-joint ball 14 allowing the device 1 to be coupled to an element of the door.

Throughout the description and the claims, the references "axial" and "radial" are with reference to the axis X.

The actuating means also comprise elastic compression means which here consist of a cylindrical spring 5 which is placed between a fixed end-stop element 6 and the operating member 2. In FIGS. 1 and 2, the spring 5 has not been depicted in order to simplify the figure. The fixed end-stop element 6 comprises a flange 7 against which one end of the spring 5 can abut, and the operating member 2 also comprises a flange 8 against which the other end of the spring 5 can abut. When the actuating means are in the passive state, the spring 5 is compressed and the two flanges 7, 8 are as close together as they can be, whereas in its active state, the two flanges 7, 8 are moved away from one another under the effect of the force of the spring 5. The fixed end-stop element 6 comprises two fixing holes 18 for fixing it to an element of the aircraft door in such a way that expansion of the spring 5 will bring about the opening of this door.

The actuating means of the device 1 additionally comprise a retainer 9a for restraining the locking second end 4 of the operating member 2, this retainer 9a here consisting of a rotary latch 9 which is able to rotate about the longitudinal axis of the operating member 2.

Figures 5, 6:
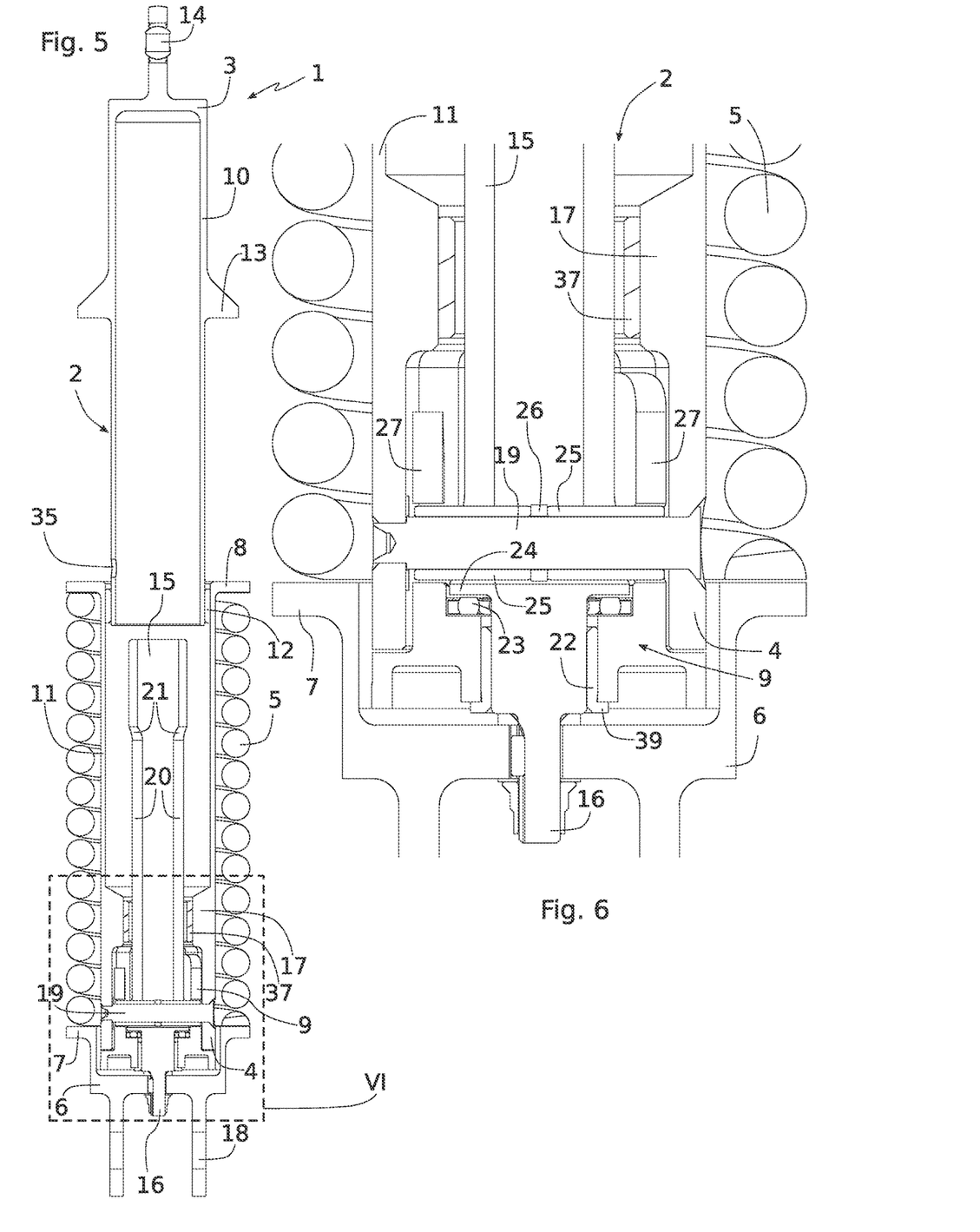
FIG. 5 is similar to FIG. 3, with the operating member in the service-opening position.
FIG. 6 is an enlarged view of the rectangle VI of FIG. 5.

The operating member 2 is a telescopic element made up of a first-end tube 10 and of a second-end tube 11 able to slide one inside the other. In the present example, the first-end tube 10 has an outside diameter smaller than the inside diameter of the second-end tube 11 so that the first-end tube 10 can be inserted inside the second-end tube 11 over a nesting portion. A sliding bearing 12, made from a material having a low coefficient of friction, is also mounted between the first-end tube 10 and the second-end tube 11 so that the sliding of the first-end tube 10 with respect to the second-end tube 11 causes the sliding bearing 12 to slide against the internal walls of the second-end tube 11. A hole 35 made in the first-end tube 10 allows any condensate that might form inside the device 1 to be discharged. The telescopic nature of the operating member 2 allows for a function referred to as the service-opening function described later on. FIG. 5 depicts the device 1 with the operating member 2 in the service-opening position.

The first-end tube 10 thus constitutes the first end 3 of the operating member 2. The first-end tube 10 is additionally provided with a flange 13 collaborating with the flange 8 which, for its part, is made on the second-end tube 11. The two flanges 8, 13 collaborate in such a way that, when the spring 5 pushes on the operating member 2 (active state of the actuating means, see FIG. 4), the spring 5 bears against the flange 8 which itself bears against the flange 13 and therefore pushes back on the whole operating member 2, moving it away from the fixed end-stop element 6. The first-end tube 10 is therefore nested to its maximum extent inside the second-end tube 11, with the flanges 8, 13 butting against one another.

The whole of the operating member 2 (which is therefore made up of the first-end tube 10 and of the second-end tube 11) can move longitudinally, along the axis X, between the two extreme positions of FIGS. 3 and 4, when emergency opening is triggered. This movement of the operating member 2 is achieved by sliding of the operating member 2 on an axis cylinder 15. The axis cylinder 15 is a cylinder fixed to the fixed end-stop element 6 by screw-fastening means 16. The axis cylinder 15 provides a sliding connection for guiding the operating member 2 longitudinally, along the axis X, by virtue of a sliding portion 17 equipped with a sliding bearing 37, of the second-end tube 11.

The operating member 2 performs its service-opening function, in addition to the emergency opening function, thanks to its telescopic nature, allowing the aircraft door to be opened and closed under normal conditions of use, namely outside of emergency opening periods, the emergency opening device being kept in a passive state, and the spring 5 remaining compressed. For this function, sliding between the first-end tube 10 and the second-end tube 11 along the axis X is possible thanks to the sliding bearing 12 described hereinabove.

When the device 1 is in the position of FIG. 3, the aircraft door is closed. Starting from this position, there are two ways in which the door can open:

an emergency opening mode in which the actuating means are activated.

Expansion of the spring 5 will then cause the fixed end-stop element 6 and the second-end tube 11 to move apart (because of the flanges 7, 8). The flange 8 will additionally itself drive the flange 13, and therefore the first-end tube 10, along the axis X. The whole operating member 2 therefore arrives in the position of FIGS. 2 and 4, the door being opened as a result of the thrusting action of the spring 5;

a service-opening mode in which the first-end tube 10 slides freely inside the second-end tube 11, under the effect of the door being opened by an external action, as far as the position of FIG. 5 which corresponds to the full opening of the aircraft door.

In order to allow the operating member 2 to be locked in its position of FIGS. 1 and 3, the second-end tube 11 comprises an axial retaining finger 19 passing all the way through the tube 11 along a diameter. The finger 19 may consist, for example, of a solid metal rod, of a pin, or of a bolt, which can be screwed or crimped onto the tube 11.

The finger 19 is inserted into a double slot 20 made in the axis cylinder 15, preventing relative rotation of the second-end tube 11 with respect to the axis cylinder 15 about the longitudinal axis. A sliding connection is thus created between the operating member 2 and the axis cylinder 15.

The finger 19 additionally provides an end-of-travel stop function. In the end-of-travel position of FIG. 4, the operating member 2 is halted by the abutment of the finger 19 against end surfaces 21 of the double slot 20.

FIG. 6 is an enlarged view of the rectangle VI of FIG. 3. In this locked position, the rotary latch 9 is in the closed position and collaborates with the finger 19 to restrain the second end 4 of the operating member 2.

The rotary latch 9 is mounted on the axis cylinder 15 with a pivot connection that allows it to rotate about the axis X, thanks to a sliding ring 22 that has a low coefficient of friction. The rotary latch 9 is fixed axially to the axis cylinder 15 between two sliding axial end stops consisting of a thrust ball bearing 23 placed between the rotary latch 9 and a shoulder 24 of the axis cylinder 15, and of an axial stop flange 39 of the sliding ring 22. The rotary latch 9 is thus in a non-sliding pivot connection on the axis cylinder 15. The thrust ball bearing 23 and the sliding ring 22 allow the rotary latch 9 to rotate with respect to the axis cylinder 15 with very low friction force. The rotary latch 9 is solidly attached to an activation means consisting of a lever 31 allowing the latch 9 to be forced to rotate.

The lever 31 is able to move in a working window 36 made in the fixed end-stop element 6 and interrupting the flange 7 on which the spring 5 can abut (see FIGS. 1 and 2). The fixed end-stop element 6 comprises two projections 38 maximizing the bearing surface for the springs 5, considering the presence of the working window 36.

The finger 19 also comprises two rolling rings 25 in the continuation of one another, with an annular separator 26 between the two rolling rings 25. The two rolling rings 25, and possibly also the annular separator 26, are in pivot connection with the finger 19, with the possibility of rotating about the longitudinal axis of the finger 19.

Figures 7, 8:
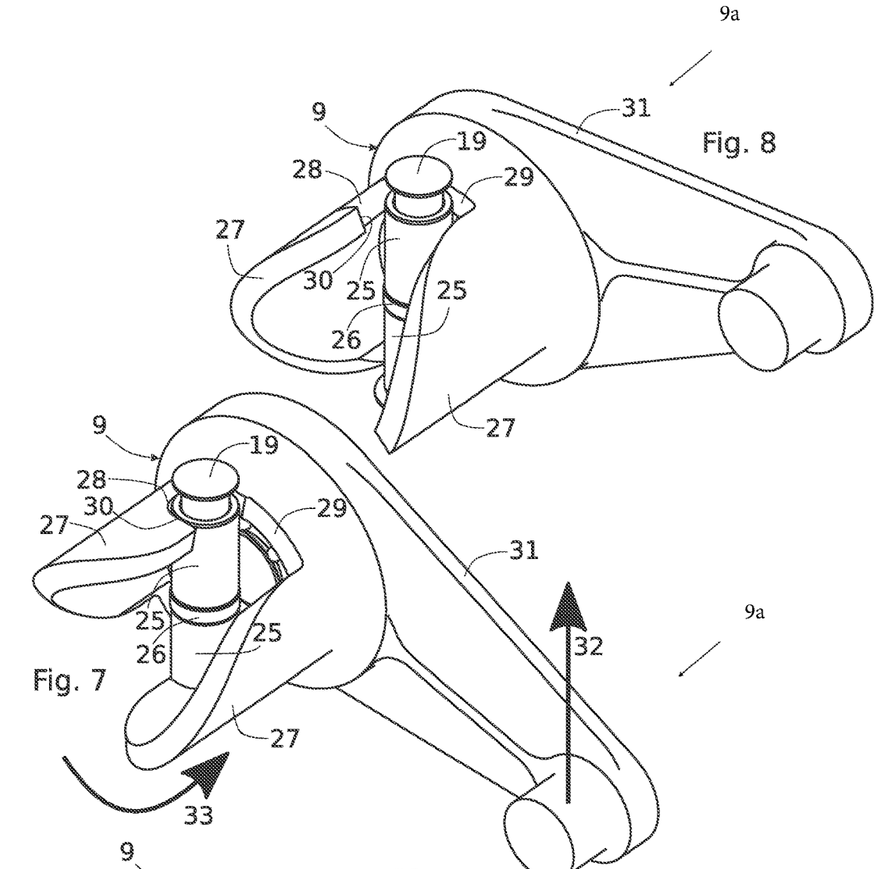
FIG. 7 depicts the retainer and the axial retaining finger of the device in its position of FIG. 1.
FIG. 8 is a perspective depiction of the retainer and the axial retaining finger of the device in its position of FIG. 2.

The collaboration between the rotary latch 9 and the finger 19 will be described with reference to FIGS. 7 and 8 which depict only these two members 9, 19 for the purposes of description. In FIG. 7, the rotary latch 9 is in its closed position in which it restrains the finger 19, and therefore the second end 4 of the operating member 2, against the action of the spring 5 which is compressed (which corresponds to the position of FIG. 3). In FIG. 8, the rotary latch 9 is in its open position and no longer restrains the finger 19, this corresponding to the releasing of the second end 4 of the operating member 2, prior to expansion of the spring 5 which will lead to the position of FIG. 4.

The rotary latch 9 comprises two opposite blades 27 which each comprise a hook 28, these two blades 27 extending axially, namely parallel to the axis X. Two slots 29 are made between the two blades 27 so that, in the open position of FIG. 8, the finger 19 of the second end 4 can be inserted into the bottom of the slots 29 and, in the closed position of FIG. 7, rotating the rotary latch 9 toward its closed position causes the finger 19 to be retained by the hooks 28.

Figure 9:
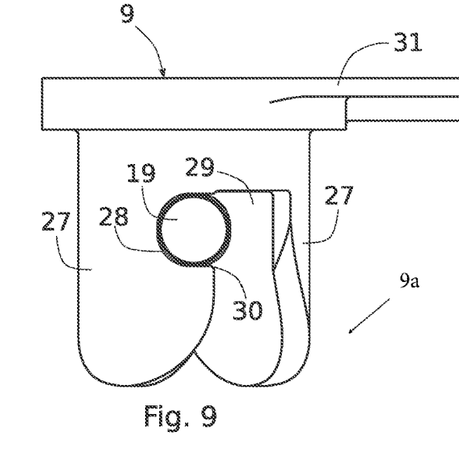
FIG. 9 depicts the elements of FIG. 7, viewed from above.

FIG. 9 is a view of FIG. 6 from above and shows the collaboration between a hook 28 and the finger 19. The hook 28 restrains the finger 19 via a stop surface 30 against which the finger 19 is forced by the force of the spring 5. The stop surface 30 is orthogonal to the axis X.

When the device 1 is in the position of FIGS. 1 and 3, the rotary latch 9 being in its closed position of FIG. 7, emergency opening can be actuated by a user by actuating the lever 31 in the direction of the arrow 32 of FIG. 7, which causes the rotary latch 9 to rotate in the direction of the arrow 33. Each rolling ring 25 will then roll along the stop surface 30 (each rotating with respect to the finger 19 but in an opposite direction) as far as the position of FIG. 8 in which the rotary latch 9 is in the open position and in which the operating member 2, which is then no longer restrained, is immediately thrust by the spring 5 toward its position of FIG. 4, bringing about emergency opening. The annular separator 26 allows the rolling rings 25 to rotate in two opposite directions.

Figure 10:
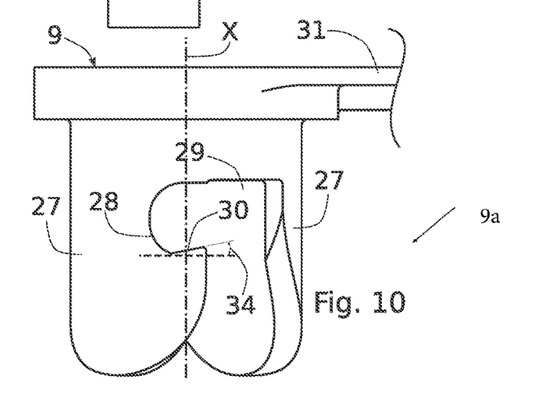
FIG. 10 is similar to FIG. 9, for a variant of the retainer.

FIG. 10 illustrates an optional feature for the stop surface 30. In this variant, the stop surface 30, while still substantially orthogonal to the axis X, does, however, have a security angle 34. The angle 34 is formed between the stop surface 30 and a surface strictly orthogonal to the axis X (indicated schematically in dotted line). This angle 34 is preferably comprised between 1 and 5° and allows the rotary latch 9 to be stable in the closed position, avoiding undesired triggering of the opening device as a result of vibrations, or other phenomena, which could cause unwanted rotation of the rotary latch 9.

Optionally, the lever 31 may also be secured against undesired triggering by a pin, such as a quick-release pin with spring-loaded ball.

Embodiment variants may be envisioned without departing from the scope of the invention. For example, the blades 27 of the rotary latch 9 may surround the second-end tube 11 on the outside, rather than being inserted inside this tube 11. The finger 19 would then project on each side of the second-end tube 11 in order to collaborate with the hooks 28.

Furthermore, the number of blades 27 and of hooks 28 may vary, at least one hook 28 being needed to collaborate with the finger 19.

Activation of the emergency opening device 1 can be achieved by means other than a lever, for example by a rack used to rotate the rotary latch 9.

The axis cylinder 15 may for example surround the second-end tube 11, instead of the reverse.

The invention claimed is:

1. An emergency opening device for an aircraft door fitted with an opening mechanism, the device comprising:
an actuating device (2, 5) designed to actuate the opening mechanism, the actuating device (2, 5) switches between a passive state and an active state of activating the opening mechanism, and the actuating device (2, 5) comprises: a tubular operating member (2) provided with a first end (3) connected to the aircraft door, and with a locking second end (4); an elastic compression device (5) arranged between a fixed end-stop element (6) and the tubular operating member (2); a retainer (9a) for restraining the locking second end (4) to move between a closed position of locking of the locking second end (4), in a position of the tubular operating member (2) corresponding to the passive state of the actuating device to keep the elastic device (5) compressed, and an open position of releasing of the locking second end (4) allowing the tubular operating member (2) to move along an axis of movement (X) toward a position corresponding to the active state of the actuating device, under an effect of a force resulting from the expansion of the elastic device (5);
an activating device (31) for activating the actuating device (2, 5) designed to bring about opening of the retainer (9a);
the tubular operating member (2) has a radial retaining finger (19) on the locking second end (4);
the retainer (9a) comprises a hook (28) having a stop surface (30), the retainer (9a) rotates about the axis of movement (X) between the closed position, in the closed position, the stop surface (30) is in contact with the radial retaining finger (19) to lock the locking second end (4), and the open position, in the open position the stop surface (30) is away from the radial retaining finger (19).

2. The device as claimed in claim 1, wherein the locking second end (4) has the radial retaining finger (19) passing radially right through the second end (4).

3. The device as claimed in claim 1, wherein the retainer (9*a*) comprises a rotary latch (9) equipped with an axially extending blade (27), the hook (28) being made in the an axially extending blade (27).

4. The device as claimed in claim 3, wherein the rotary latch (9) comprises two axially extending blades (27), a hook (28) being made in each one of the axially extending blade (27), two slots for a passage of the radial retaining finger (19) being formed between each one of the axially extending blades (27).

5. The device as claimed in claim 1, wherein the activating device of the actuating device (2, 5) comprises a lever (31) designed to force the retainer (9*a*) to rotate.

6. The device as claimed in claim 5, wherein the fixed end-stop element (6) comprises:
- an abutment flange (7) against which the elastic device (5) bears;
- a working window (36) tailored to suit the travel of the lever (31) and interrupting the abutment flange (7).

7. The device as claimed in claim 1, wherein the retainer (9*a*) has a shape that inscribes inside a cylinder coaxial with the tubular operating member (2).

8. The device as claimed in claim 1, wherein the retainer (9*a*) is mounted to rotate with respect to the fixed end-stop element (6).

9. The device as claimed in claim 1, further comprising an axis cylinder (15) fixed to the fixed end-stop element (6), the operating member (2) slides on the axis cylinder (15) along the axis of movement (X).

10. The device as claimed in claim 9, wherein the operating member (2) surrounds the axis cylinder (15) and comprises a sliding portion (17) to guide the operating member (2) on the axis cylinder (15).

11. The device as claimed in claim 9, wherein the retainer (9*a*) surrounds the axis cylinder (15) and is mounted to rotate on the axis cylinder (15).

12. The device as claimed in claim 11, wherein the retainer (9*a*) is axially fixed to the axis cylinder (15), being held between two sliding axial end stops (23, 39).

13. The device as claimed in claim 9, wherein the axis cylinder (15) comprises a guide slot (20) for guiding the radial retaining finger (19) along the axis of movement (X).

14. The device as claimed in claim 13, wherein the radial retaining finger (19) passes radially through the axis cylinder (15) at the guide slot (20).

15. The device as claimed in claim 13, wherein the guide slot (20) has an end-of-travel end stop (21) for the radial retaining finger (19).

16. The device as claimed in claim 1, wherein the radial retaining finger (19) comprises a rolling ring (25) designed to roll over the stop surface (30).

17. The device as claimed in claim 1, wherein the stop surface (30) is orthogonal to the axis of movement (X).

18. The device as claimed in claim 17, wherein the stop surface (30) forms, with respect to a surface orthogonal to the axis of movement (X), an angle comprised between 1 and 5 degrees.

19. The device as claimed in claim 1, wherein the elastic compression device comprises a tubular spring (5) to partially surround the operating member (2) and the ends of which are placed between the fixed end-stop element (6) and the operating member (2).

* * * * *